(12) United States Patent
Minarczyk et al.

(10) Patent No.: US 8,284,536 B2
(45) Date of Patent: Oct. 9, 2012

(54) SURGE PROTECTION MODULE FOR LUMINAIRES AND LIGHTING CONTROL DEVICES

(75) Inventors: Michael M. Minarczyk, Granville, OH (US); Robert Scites, Columbus, OH (US); Yaser Abdelsamed, Granville, OH (US)

(73) Assignee: ABL IP Holding LLC, Conyers, GA (US)

( * ) Notice: Subject to any disclaimer, the term of this patent is extended or adjusted under 35 U.S.C. 154(b) by 272 days.

(21) Appl. No.: 12/625,767

(22) Filed: Nov. 25, 2009

(65) Prior Publication Data

US 2010/0127625 A1 May 27, 2010

Related U.S. Application Data

(60) Provisional application No. 61/118,045, filed on Nov. 26, 2008.

(51) Int. Cl.
*H01C 7/12* (2006.01)

(52) U.S. Cl. .......... 361/118; 361/117; 361/115; 361/90; 361/1

(58) Field of Classification Search .......... 361/115–138, 361/1, 2, 14, 18–21, 36, 38–45, 62, 68–70, 361/110, 103
See application file for complete search history.

(56) References Cited

U.S. PATENT DOCUMENTS

| | | | |
|---|---|---|---|
| 4,021,760 A | 5/1977 | Campi | |
| 4,271,446 A | 6/1981 | Comstock | |
| 4,340,853 A * | 7/1982 | Braun et al. | 324/546 |
| 4,843,515 A | 6/1989 | Richman | |
| 4,845,580 A | 7/1989 | Kitchens | |
| 4,901,183 A | 2/1990 | Lee | |
| 5,023,746 A | 6/1991 | Epstein | |
| 5,341,265 A | 8/1994 | Westrom et al. | |
| 5,617,284 A | 4/1997 | Paradise | |
| 5,625,521 A | 4/1997 | Luu | |
| 5,691,605 A | 11/1997 | Xia et al. | |
| 5,914,845 A | 6/1999 | Chase | |
| 6,118,639 A | 9/2000 | Goldstein | |
| 6,614,636 B1 | 9/2003 | Marsh | |
| 6,646,839 B2 | 11/2003 | Chaudhry et al. | |
| 6,728,089 B2 | 4/2004 | Harford | |
| 7,023,680 B1 | 4/2006 | Johnson et al. | |
| 7,082,021 B2 | 7/2006 | Chan et al. | |
| 2002/0054465 A1* | 5/2002 | Gerlach | 361/111 |
| 2005/0036262 A1 | 2/2005 | Siebenthall et al. | |
| 2006/0007625 A1 | 1/2006 | Harford | |
| 2006/0158171 A1 | 7/2006 | Downey et al. | |
| 2007/0086141 A1* | 4/2007 | Elms | 361/118 |
| 2007/0217111 A1* | 9/2007 | Tseng | 361/118 |

* cited by examiner

*Primary Examiner* — Tuyet Thi Vo
(74) *Attorney, Agent, or Firm* — Kilpatrick Townsend & Stockton LLP (57) ABSTRACT

A luminaire can comprise an electronic circuit, such as an LED driver or electronic ballast. A surge protection device in the current path between a power supply and the luminaire components can be configured to protect the electronic circuitry by absorbing and/or redirecting energy of a surge by switching into a low-impedance state while maintaining the protected circuitry (including its internal protective components, if any) in a high-impedance state. The surge protection device can comprise a MOV stage and a filter stage, for example. The surge protection device can be configured as a replaceable module, with the luminaire including an assembly designed to receive the module and allow for easy replacement over the useful life of the other components. Use of fuses or thermal components may cause the surge protection device to interrupt power flow if protection is lost due to internal failure, indicating when module replacement is needed.

16 Claims, 7 Drawing Sheets

Figure 7

SURGE PROTECTION MODULE FOR LUMINAIRES AND LIGHTING CONTROL DEVICES

PRIORITY CLAIM

This application claims priority to U.S. Provisional Patent Application 61/118,045, filed Nov. 26, 2008, which is incorporated by reference herein in its entirety.

TECHNICAL FIELD

Embodiments discussed herein relate generally to the field of protection for electrical circuits.

BACKGROUND

Surge protection devices can be used to protect sensitive electronics from transients, such as spikes on power lines due to nearby lightning.

As lighting technology advances, certain lighting components may be introduced that are more sensitive to transients. Examples of components that need protection include, but are not limited to, electronic ballasts, light emitting diode (LED) drivers, and electronic lighting controls. A typical electronic ballast or other lighting circuit may include internal protective elements, such as fuses and/or metal oxide varistors (MOV) integrated directly into the lighting circuit (e.g., on the circuit board). These elements may protect the lighting circuit from catastrophic failure (e.g., bursting into flames) due to external surges of energy, but may also trigger in less-than-catastrophic situations. These elements may also protect against events internal to the circuitry, such as internal shorts.

In many events, once triggered, the fuses and/or MOVs are no longer functional. The entire lighting circuit may require replacement if, for example, the fuses, MOVs, or other protective elements are integrated directly into the circuit and cannot be replaced separately in an economical manner.

SUMMARY

Lighting circuits with internal protection may represent a significant expense and may otherwise have a long expected service life. For example, in some embodiments, the lighting device may have a useful life of 50,000 hours or beyond, and thus may face an appreciable chance of exposure to an external transient condition. Rather than requiring replacement of the entire circuit due to triggering of the internal protection circuitry, embodiments discussed below utilize a surge protection device that can prevent the internal protective circuitry from activating during all but the most extreme surge events. Use of a surge protection device in accordance with one or more aspects of the present subject matter can allow for easy replacement of the surge components over the useful life of the other components of the lighting device.

In one embodiment, a lighting device comprises at least one electronic circuit and an internal protection component. The electronic circuit may, for instance, comprise an LED driver, electronic ballast, or another component used to power/control light-emitting components of the lighting device. The internal protection component may comprise an MOV, a fuse, and/or another protective component. The lighting device can further comprise a surge protection device in the current path between a power supply and the internal protective component. The surge protection device can be configured to absorb and/or redirect energy of a surge so as to reduce or eliminate triggering of the internal protective component.

For example, the surge protection device can comprise a MOV stage and a filter stage, with the MOV stage triggered by a surge event and the filter stage configured to absorb energy prior to and/or after MOV triggering so that any transient component that reaches the internal protective components of the lighting device does not trigger the internal protective components. Thus, the electronic device and internal components do not require replacement even in the event of a transient event. In some embodiments, the surge protection device is configured as a replaceable module, with the lighting device including an assembly designed to receive the module.

These illustrative embodiments are mentioned not to limit or define the limits of the present subject matter, but to provide examples to aid understanding thereof. Illustrative embodiments are discussed in the Detailed Description, and further description is provided there. Advantages offered by various embodiments may be further understood by examining this specification and/or by practicing one or more embodiments of the claimed subject matter.

BRIEF DESCRIPTION OF THE DRAWINGS

A full and enabling disclosure is set forth more particularly in the remainder of the specification. The specification makes reference to the following appended figures, in which use of like reference numerals in different features is intended to illustrate like or analogous components.

DETAILED DESCRIPTION

Reference will now be made in detail to various and alternative exemplary embodiments and to the accompanying drawings, with like numerals representing substantially identical structural elements. Each example is provided by way of explanation, and not as a limitation. It will be apparent to those skilled in the art that modifications and variations can be made. For instance, features illustrated or described as part of one embodiment may be used on another embodiment to yield a still further embodiment. Thus, it is intended that this disclosure includes modifications and variations.

Figure 1:
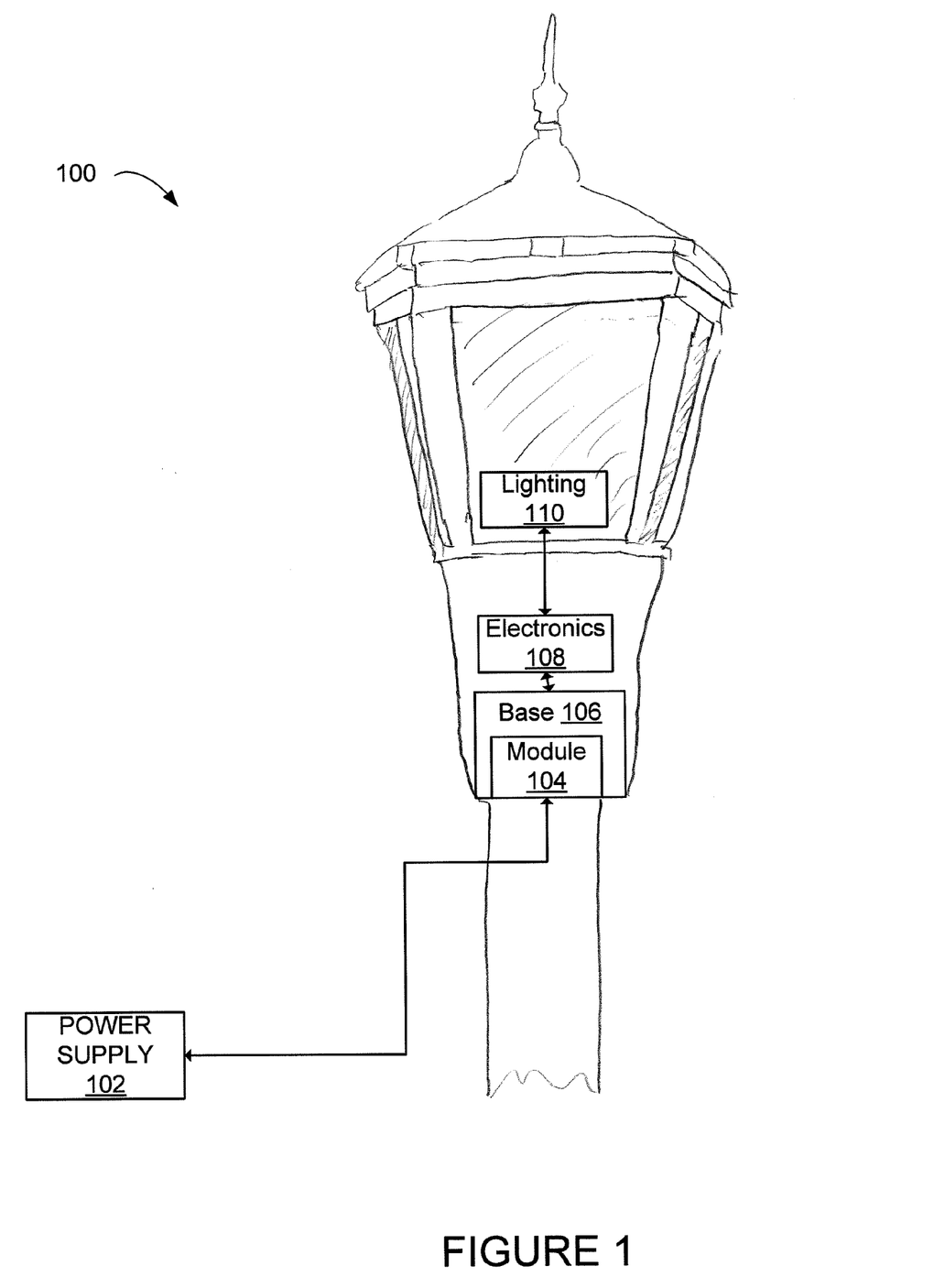
FIG. 1 is a diagram showing an example of using a surge protection device in a luminaire.

FIG. 1 is a diagram showing an example of using a surge protection device in a luminaire. Particularly, a lighting device 100 is connected to a power supply 102 by way of a module 104 interfaced to an interconnection base 106. Interconnection base 106 is connected to electronic circuitry 108, which can comprise any suitable type or arrangement of components used to drive lighting component(s) 110. Electronic circuitry 108 can comprise, for example, LED drive circuitry, electronic ballast, and/or may be interfaced to electronic controls or sensors for use with lighting device 100. Lighting component(s) 110 can comprise one or more light emitting diodes (LEDs), fluorescent lights, or other devices that convert electrical energy to light. Typically, although not necessarily, electronic circuitry 108 can comprise one or more circuit boards.

As noted above, electronic circuitry of lighting devices can feature internal surge protection devices. Internal surge protection devices may use a single component based entirely on a metal oxide varistor (MOV). MOVs divert electrical transients of the surge away from the sensitive electronics or other components. However, in previous devices, moderate and damaging voltage and current transients could still reach the electronics despite the MOVs; these "let-through" transients may pose a significant risk to product reliability. Additionally, the internal surge protection devices may be integrated into the electronic circuitry (e.g., fuses and MOVs on the same board). If the protection is over-sensitive (e.g., triggering in response to a nearby lighting strike that poses minimal danger), the entire collection of electronic circuitry may require replacement. Thus, use of a single device surge protection component for the protection of outdoor electronics, for example, may not be an acceptable method to ensure long life and desired operation of lighting products.

Accordingly, a surge protection device included in module 104 can be used in addition to the internal protective components to avoid triggering of portions of the circuitry that are difficult or impossible to repair or replace. Although shown in modular form in FIG. 1, in some embodiments, a non-modular surge protection device can be used. For example, a suitable connection between a power supply and an input to an internal protective device of the electronic circuitry can be provided on a board and bridged by a surge protection device as discussed herein. This may, for example, allow for the use of relatively inexpensive indoor-rated lighting components and associated circuitry (e.g., drivers and ballast) in outdoor scenarios where the components would otherwise need frequent replacement due to triggering from transients.

Figure 2:
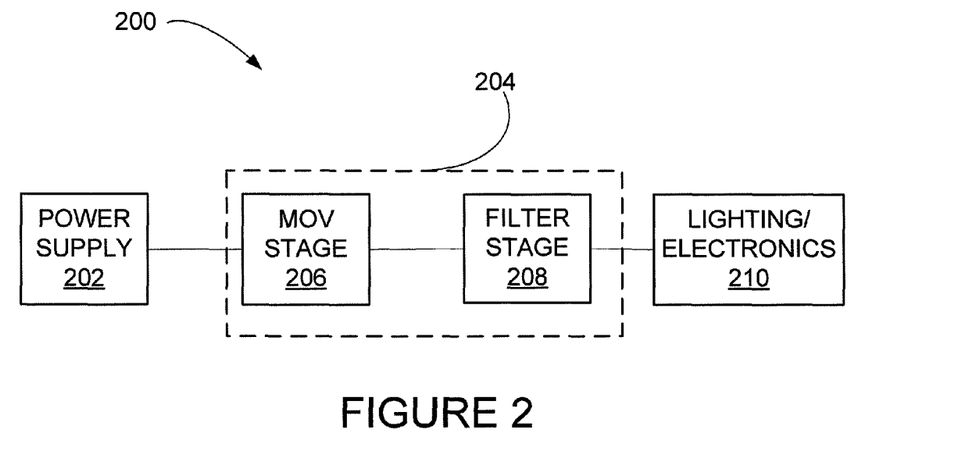
FIG. 2 is a generalized block diagram illustrating an example of a protection device configured in accordance with one or more aspects of the present subject matter.

FIG. 2 is a generalized block diagram showing an example of a circuit 200 configured in accordance with aspects of the present subject matter. The use of device 204 may advantageously protect against let-through transients and allow the use of more sensitive electronics and lighting components than would be possible or advisable if a single device surge protection component were to be used alone. Additionally, by absorbing/diverting surge energy from electronics 210, triggering of the internal protective device(s) can be reduced or avoided.

Namely, circuit 200 comprises a surge protection device 204 in a current path between a power supply/source 202 and a lighting system and related electronics 210. In this example, surge protection device 204 comprises a MOV stage 206 and a filter stage 208. In contrast to surge protection configurations that use a single component based entirely on MOVs, surge protection device 204 includes both MOVs and filtering components. The filtering components can be selected to absorb energy associated with transients that do not trigger the MOVs but still pose a risk of triggering internal protective circuitry and/or may protect against transient conditions that occur while the MOVs are in the process of triggering.

The surge protection device is configured to respond to a transient condition by switching into a low impedance state while maintaining the protected component(s) (in this example, electronic circuitry) in a high impedance state during the transient. Any number or type of electronic or other components can be protected. Although these examples depict an "MOV stage" 206, MOV stage 206 can be viewed more generally as an "energy dissipation/diversion" stage, and could be implemented with other components with similar behavior to MOVs. For example, gas tube suppressors or other clamping components can be used.

The filtering stage, which acts to maintain the protected circuitry in a high-impedance state, may be implemented using inductors or other components with a suitable response. Use of inductors allows the protection device to protect against major transient events, such as large current and/or voltage surges that trigger the switch to the low impedance state at stage 206. However, the inductors also protect against as smaller "blips" that may not trigger stage 206 but could otherwise interfere with operation of the protected circuitry.

Figure 3A:
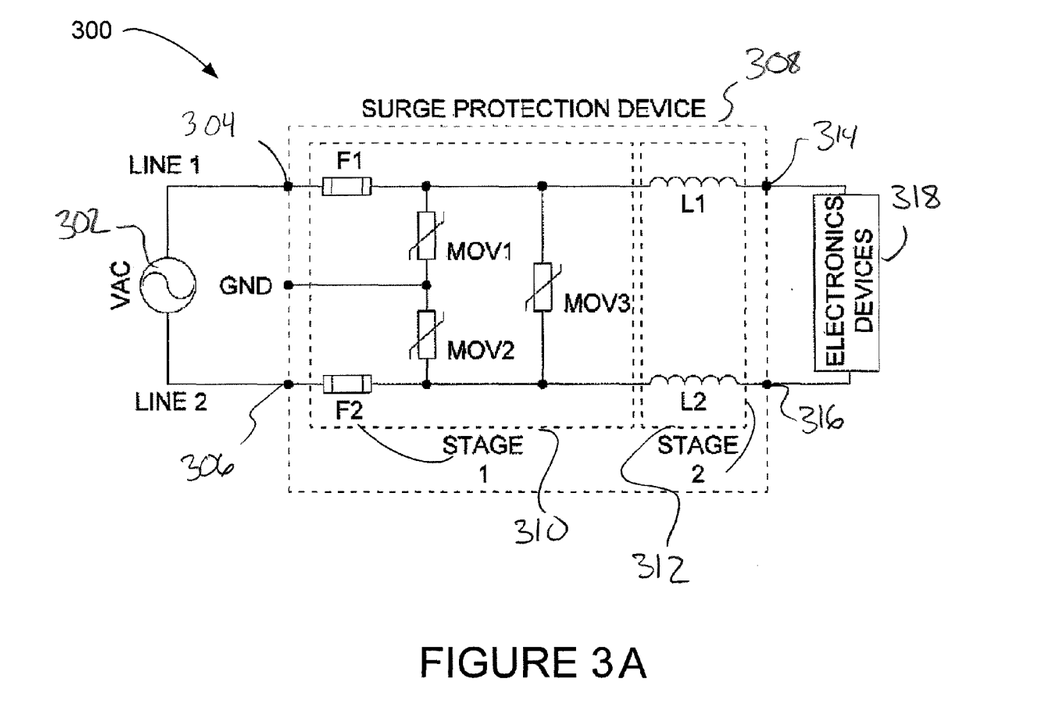
FIGS. 3A and 3B are each a circuit diagram illustrating an exemplary circuit for a protection device configured in accordance with one or more aspects of the present subject matter.

FIG. 3A is a circuit diagram illustrating an exemplary circuit 300 for a protection device configured in accordance with one or more aspects of the present subject matter. In this example, power supply 302 comprises an AC voltage source VAC with LINE 1 and LINE 2 terminals. A ground terminal GND is also available. The surge protection device features a first line input 304 and a second line input 306 (along with a ground line input) and is represented by the larger box 308 outlining two stages, Stage 1 (also labeled as 310) and Stage 2 (also labeled as 312).

The surge protection device includes a first line output 314, a second line output 316, and is connected across those outputs to a load 318 that can comprise one or more lighting devices with related electronics. Particularly, the output of surge protection device 308 may be connected to an input of electronics 318 so that power can be provided through the surge protection device, with current routed into an internal protective component (not shown) of electronics 318 unless, of course, the surge protection device 308 is triggered.

The MOV stage (Stage 1) includes a line fuse (F1, F2) on each of the two lines LINE 1 and LINE 2. For example, fuses F1 and F2 may comprise thermal or current-type fuses that are triggered by excessive current or temperature. In the event that the surge protection device fails, one or both of these fuses will open (i.e. "blow"), disable the electronics, and thereby prevent the electronics from experiencing an unprotected state and/or prevent a high internal temperature within the surge protection device. After the fuses, MOV devices (MOV1, MOV2, MOV3) are arranged to protect against common mode (MOV1, MOV2) and differential mode (MOV3) transients.

In this example, a first node is defined at the connection between fuse F1, MOV1, and MOV3 and a second node is defined at the connection between fuse F2, MOV2, and MOV3. Fuse F1 is connected between the first line input and the first node. MOV 1 is connected between the first node and the ground connection. Fuse F2 is connected between the second line input and the second node. MOV2 is connected between the second node and the ground connection. MOV3 is connected between the first and second nodes.

Stage 2 represents the filter stage. The filter stage is effectively a filter circuit that blocks high-frequency let-through transients but allows low frequency voltage (e.g. 60 Hz line voltage) to pass to the electronics. Thus, in some implementations, the filter stage comprises a low-pass filter. In this example, the impedance circuit comprises two inductors (L1, L2), with inductor L1 connected between the first node and the first line output 314 and the second inductor L2 connected between the second node and line output 316, creating a balanced line that allows the device to be used in various voltage configurations. For example, the device could be used in a 208V configuration with a hot and neutral line or a 240 V configuration with both lines hot.

Values for fuses F1 and F2 and MOVs 1-3 can be selected to pass expected load currents and to breakdown (MOVs) and or break flow (fuses) in response to transient conditions. In some embodiments, L1 and L2 comprise inductors with a value of between 250 and 330 uH.

In practice, other values and component arrangements can be used in order to dissipate/divert energy in a manner so as to avoid or reduce the chance of triggering the internal protection circuitry of electronics 318. Outside of design scenarios, it may remain possible for an extreme transient to trigger the both the surge protection device and the internal device; such a case would also likely involve destruction of the lighting device. Additionally, the arrangement can be used to protect electronics 318 or other circuitry even if such electronics or circuitry lack internal protection components.

Figure 3B:
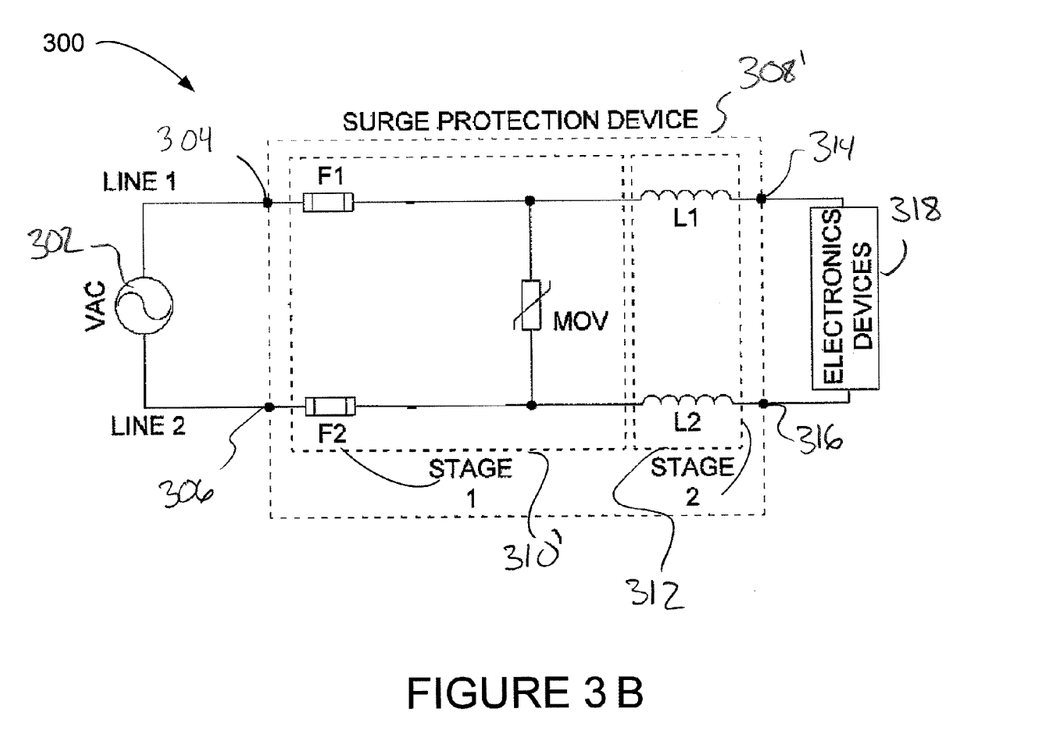

It will be understood that components can be substituted or interchanged and further may be optimized for different scenarios. For example, the circuit could be configured to support different operating voltages. FIG. 3B shows another example of a circuit 300 featuring a surge protection device. In this example, surge protection device 308' includes a first line input 304, a second line input 306, a first line output 314, and a second line output 316 as before. Additionally, a power supply 302 is shown along with electronics or other protected device(s) 318. In this example, a metal oxide varistor (MOV) stage 310' is used and comprises a single MOV, since no ground connection is included. Thus, a first fuse F1 is connected between the first line input 204 and a first node, a second fuse F2 is connected between the second line input and a second node, and the MOV is connected between the first and second nodes. As in the case of FIG. 3A, the filter stage comprises a first inductor L1 connected between the first node and the first line output 314, and a second inductor L2 connected between the second node and the second line output 316.

Combining the filter stage with the MOV stage, a surge protection device can provide adequate protection for lighting components utilizing sensitive electronics in outdoor or other harsh environments. An advantage of the filter stage is to prevent the internal protective component(s) of electronic circuitry 318 from activating during all but the most extreme surge events. Additionally, despite the use of protection device 308, the operation of circuitry 318 will be completely unaffected when protecting against dangerous failures of the lighting device or circuitry (e.g. internal short circuit).

Figure 4:
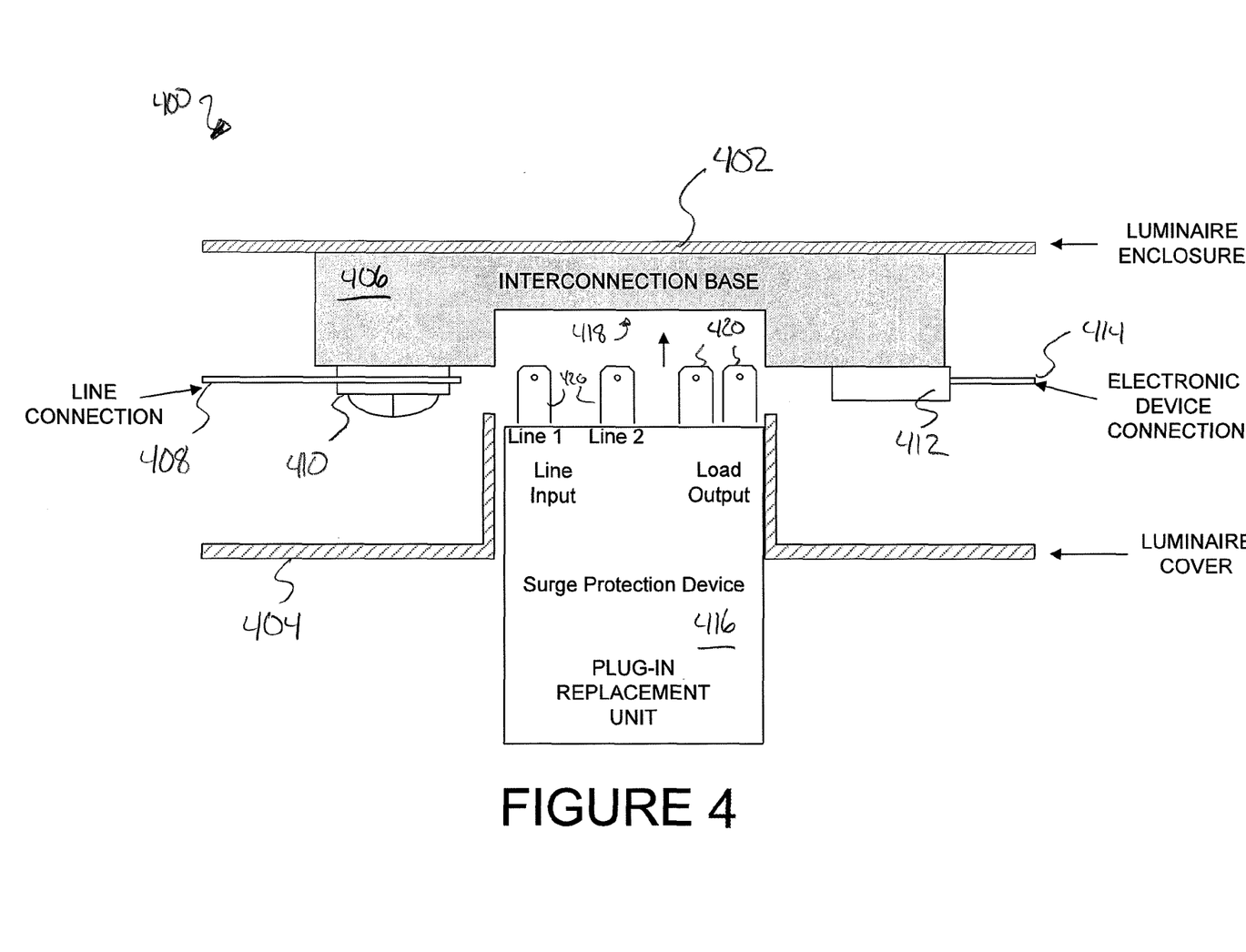
FIG. 4 is a block diagram showing an example of a replaceable surge protection module in a luminaire configured in accordance with one or more aspects of the present subject matter.

FIG. 4 is a block diagram illustrating an example 400 of an embodiment where a surge protection device is configured as an add-on surge protection module. For example, the module may contain a surge protection device such as device 308 illustrated in FIG. 3A or 3B above or another suitable protection device. In this embodiment, the surge protection device is intended to not only protect the more costly electronic devices connected on the output, but also to allow for easy restoration of the current path after the path has been broken.

In this example, the lighting device is a luminaire having an enclosure 402 and 404. The enclosure shields an interconnection base 406, which defines an input for a power supply (in this example, line connection 408 and terminal 410) and an output that is connected to the internal surge protection device(s) of the electronic circuitry (in this example, the output is depicted as another terminal 412 and an electronic device connection 414).

Module 416 features a body and contains the surge protection device. Interconnection base 406 is adapted to receive module 416. Particularly, in this example the base is shaped so that the body of module 416 fits snugly therein while placing the surge protection device in electrical contact with the line connection and the electronic device connection. In some embodiments, module 416 may be completely or at least partially housed within the luminaire. Module 416 features a plurality of contacts 420, which can be shaped to engage contacts in base 406 to make suitable electrical connections. For instance, contacts 420 may be blades or prongs and base 402 can feature suitable slots or holes connected to terminals 410, 412, and/or otherwise as appropriate.

When module 416 is interfaced with base 406, the first and second line inputs can be connected to power supply lines of the device and the first and second line outputs are connected to the electrical circuitry of the device. It will be understood that more or fewer inputs/outputs can be used depending on circuit configurations and other requirements.

FIG. 4 also shows a luminaire cover 404 shaped to be placed over the electronic device connection and the line connection. The location of the surge protection device in the luminaire can provide extreme ease in replacement—if a surge protection device fails, the module containing the surge protection device can be removed and replaced with a new module to quickly and inexpensively bring the luminaire back into full operation. Although shown in conjunction with a luminaire, it will be understood that other lighting devices could be configured to use a replaceable surge protection module.

Figure 5:
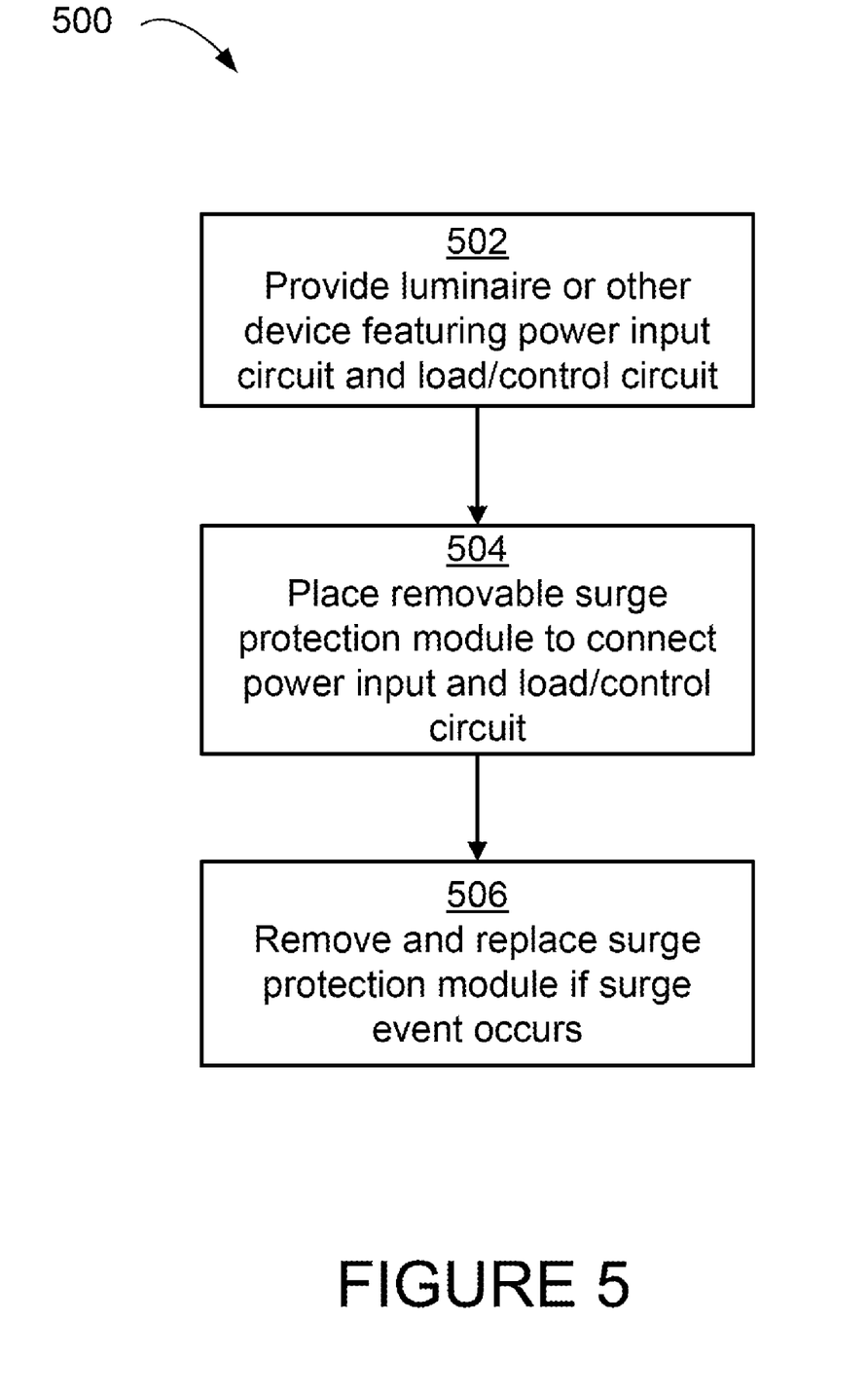
FIG. 5 is a flowchart showing an exemplary method of using a surge protection device.

FIG. 5 is a flowchart showing an exemplary method 500 for providing a luminaire or other device. Block 502 represents providing a lighting device comprising an electronic circuit having an input for receiving power and having an output, the output connected to a light-generating component of the lighting device. As was noted above, the lighting device may utilize one or more LEDs, fluorescent devices, or other light-generating components driven by electronic circuitry such as an LED driver circuit, electronic ballast, or the like.

Block 504 represents defining a defining a current path between a power source and the input of the electronic circuit by placing a surge protection component in connection with the power source and the input of the electronic circuit. In this particular example, the surge protection component is comprised in a removable module adapted to interface with a base that receives a connection to the power supply, a connection to the electronic circuit, and provides a suitable interconnection (e.g., slots, holes, etc.) at contact points of the module.

Block 506 represents activity after the current path has been broken due to triggering of the surge protection module. For example, a surge event, such as an overvoltage, a current transient, or other event may trigger fuses, MOVs, or other components of the surge protection device and render the triggered component(s) nonconductive. At block 506, the current path is restored by replacing the surge protection component without replacing the other electronic circuitry of the lighting device.

Figure 6:
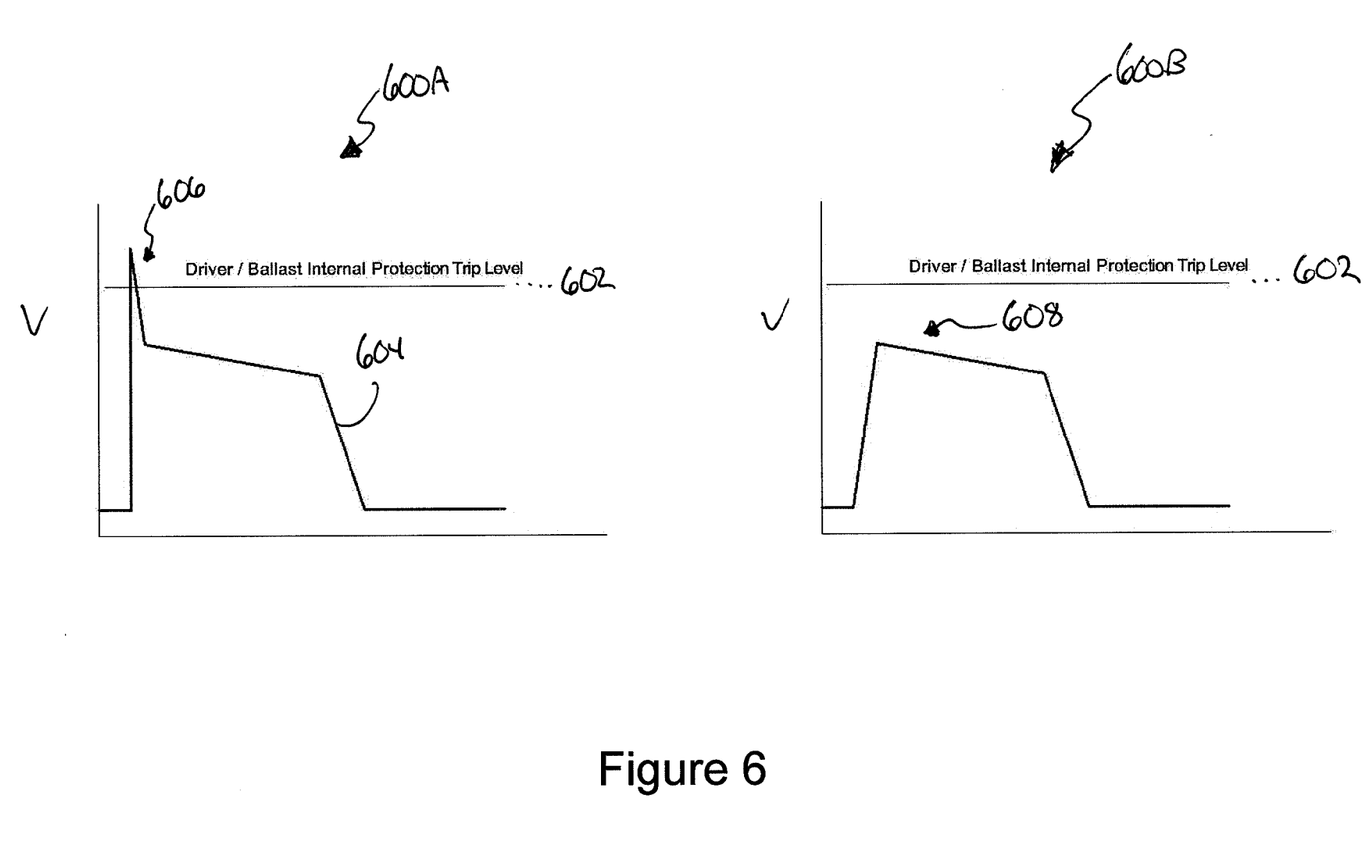
FIG. 6 includes two charts showing voltage responses, a first response when a surge protection device is absent or when certain types of protection are used; and a second response when a surge protection device in accordance with teachings herein is used.

FIG. 6 includes two charts showing voltage responses. Chart 600A shows a response when a surge protection device is absent, or when typical protection is used. Chart 600B shows a response when a surge protection device configured as taught herein is used. In both charts, a trip level 602 is shown to represent a voltage at which internal protection circuitry of a lighting device will activate. Turning to chart 600A, waveform 604 illustrates a voltage that the driver/ballast experiences with no protection or a typical, MOV-only, surge protection. When the trip level is exceeded, the driver/ballast will conduct a large amount of energy because the internal protection will cause a low impedance condition during the transient response.

Chart 600B illustrates removal of the spike in energy through use of a surge protection device configured in accordance with the present subject matter. As can be seen at 608, although the voltage increases, the surge protection device effectively removes the initial large spike that exceeds the driver/ballast's internal trip level. Due to the configuration of the surge protection device, the driver/ballast remains in a much higher impedance state and damaging energy levels are prevented from entering the driver/ballast (or other circuitry) even while the MOVs or other current-shunting components of the surge protection device are responding to the transient.

Figure 7:
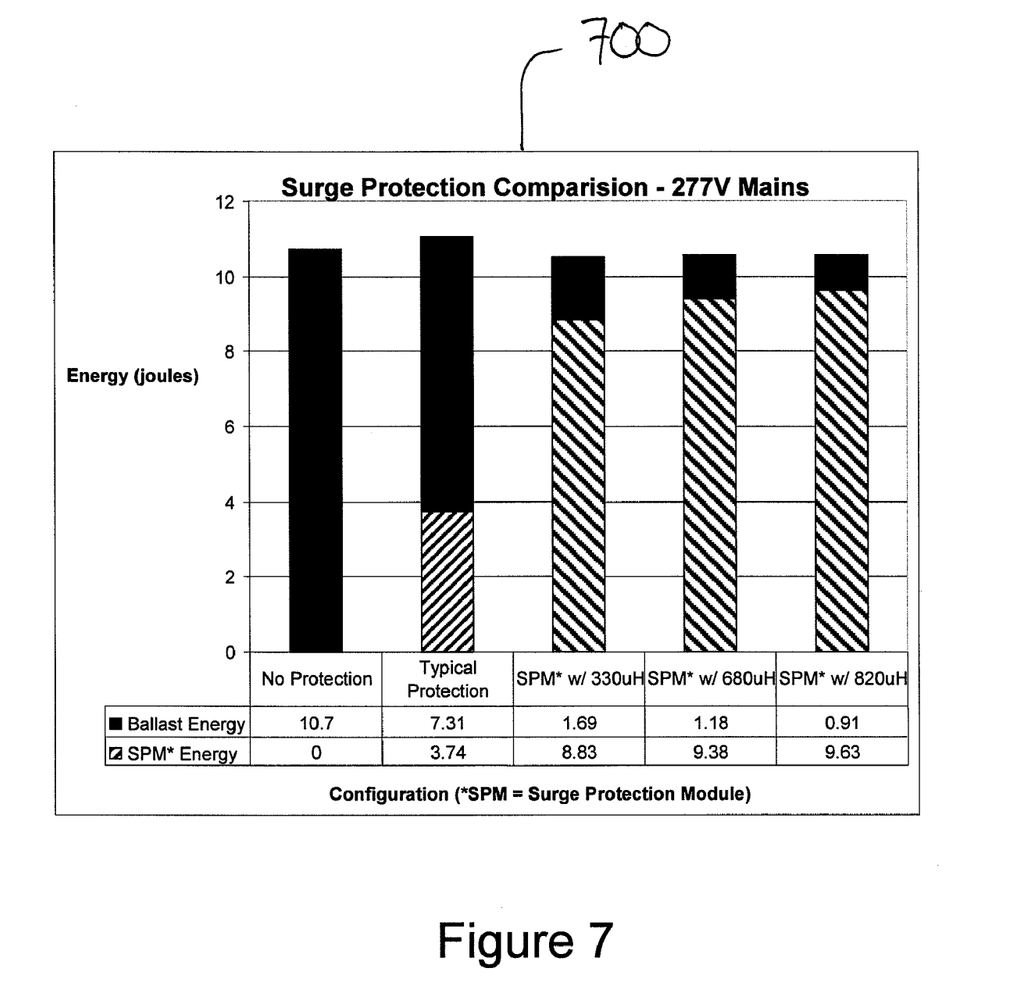
FIG. 7 is a chart illustrating examples of energy dissipation of different circuits faced with a transient/surge scenario.

FIG. 7 is a chart 700 illustrating examples of energy dissipation of different circuits faced with a transient/surge scenario. Particularly, the chart shows test results for a 277V lighting device in various configurations, depicting energy passed to the lighting device electronics ("Ballast Energy") and energy (if any) absorbed by a surge protection device ("SPD energy").

For instance, in the "No Protection," no surge protection module is used, and all of the energy passes to the device electronics. The "typical Protection," case shows use of one or more MOVs, but not a surge protection module. As can be seen in the chart, a large amount of energy is passed to the ballast because, despite the presence the MOV(s), the driver/ballast will not remain in a high-impedance state.

In accordance with the present subject matter, a surge protection device can be added, with the surge protection device including inductors and other circuitry configured as noted above. Inductors with values of 250-330 uH are used in some embodiments with the result of much less energy reaching the ballast, though even higher inductance values can be used. In FIG. 7, in the "Series with 330 uH" case, a significant amount of energy is dissipated by the surge protection device with a 330 uH inductor. The additional "Series with 608 uH" and "Series with 820 uH" cases show further improvement in energy dissipation.

Several examples above depict use of a surge protection device in conjunction with a lighting device that includes internal protection. The surge protection device is configured to respond to a transient condition to switch into a low impedance state while maintaining the electronic circuit in a high impedance state during the transient to thereby protect the at least one electronic circuit, which may include an internal protection component. However, in some embodiments, a surge protection device configured in accordance with the preset teachings can be used with a lighting device that does not otherwise include internal protection. Instead, by including both MOVs (or equivalent current-shunting components) that cause the surge protection device to respond to a transient by switching into a low impedance state, along with and inductors (or other suitable impedance components) appropriately configured to maintain a high-impedance state of the lighting device despite the transient event, the lighting device and/or other circuitry can be sufficiently protected.

Additional advantages are achieved in some embodiments due to use of fuses or other thermal links at the line inputs to the surge protection device that act to open the line in the event of an internal fault of the surge protection device. Current-shunting components may lose effectiveness after installation—for instance an MOV may short-circuit at the end of its lifetime. If protection of a lighting device is based on MOVs only, then there may be no indication that the MOVs are no longer effective. By using fuses or other thermal links, the surge protection device interrupts power to the load when surge protection is no longer available due to a failure of one or more of its internal components, as well as in response to transients. Lack of light from the lighting component despite the availability of power at the power supply can be used as an indication that the surge protection module needs replacement. Additionally, some embodiments include an indicator light and circuitry to activate the indicator light based on whether the surge protection component is operational.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

What is claimed is:

1. A lighting device, comprising:
  a lighting component;
  at least one electronic circuit having an input configured to receive current and an output configured to drive the lighting component; and
  a surge protection device, the surge protection device included in a current path between a power supply and the input of the at least one electronic circuit,
  wherein the surge protection device comprises:
    a first line input;
    a second line input;
    a first line output;
    a second line output;
    a ground connection;
    a metal oxide varistor (MOV) stage comprising:
      a first fuse connected between the first line input and a first node,
      a first MOV connected between the first node and the ground connection,
      a second fuse connected between the second line input and a second node,
      a second MOV connected between the second node and the ground connection, and
      a third MOV connected between the first and second nodes; and
    a filter stage, comprising:
      a first inductor connected between the first node and the first line output, and
      a second inductor connected between the second node and the second line output;
  wherein the surge protection device is configured to respond to a transient condition by switching into a low impedance state while maintaining the at least one electronic circuit in a high impedance state during the transient to thereby protect the at least one electronic circuit.

2. The lighting device set forth in claim 1,
  wherein the at least one electronic circuit further comprises an internal protection component at the input and configured to trigger at a threshold level of energy, and
  wherein the surge protection device is included in a current path between the power supply and the internal protection component and is configured to prevent pass-through of an amount of energy greater than or equal to the threshold level of energy.

3. The lighting device set forth in claim 2, wherein the at least one electronic circuit comprises an LED driver or an electronic ballast, and wherein the internal protection component comprises at least one of a metal oxide varistor (MOV) or a fuse.

4. The lighting device set forth in claim 2, wherein the internal protection component is included in a circuit board comprising the at least one electronic circuit.

5. The lighting device set forth in claim 2, further comprising:
an interconnection base, the interconnection base defining an input for the power supply and an output connected to the input of the internal protection component, and
wherein the interconnection base is adapted to receive a module comprising the surge protection device and to connect the input for the power supply to the input of the internal protection component through the surge protection device.

6. A surge protection module, comprising:
a body;
a surge protection device included in the body; and
a plurality of contacts of the surge protection device, including a contact for a first line input, a contact for a second line input, a contact for a first line output, and a contact for a second line output,
wherein the body and contacts are configured to interface with an interconnection base of a lighting device so that, when the module is interfaced with the base, module is at least partially housed in the lighting device, the first and second line inputs are connected to a power supply line of the lighting device, and the first and second line outputs are connected to an electrical component of the lighting device,
wherein the surge protection device comprises:
a first line input;
a second line input;
a first line output;
a second line output;
a metal oxide varistor (MOV) stage comprising:
a first fuse connected between the first line input and a first node,
a second fuse connected between the second line input and a second node, and
an MOV connected between the first and second nodes; and
a filter stage, comprising:
a first inductor connected between the first node and the first line output, and
a second inductor connected between the second node and the second line output.

7. The surge protection module set forth in claim 6, interfaced with an interconnection base of a lighting device.

8. The surge protection module set forth in claim 7, wherein the lighting device comprises an electrical circuit having an output connected to a lighting component of the lighting device, the electrical circuit comprising at least one internal protection component configured to trigger at a threshold level of energy and prevent pass-through of energy to the output of the electronic circuit if triggered, and
wherein the surge protection device is configured to prevent pass-through of an amount of energy greater than or equal to the threshold level of energy.

9. The surge protection module set forth in claim 8, wherein the at least one electronic circuit comprises an LED driver or an electronic ballast, and
wherein the internal protection component comprises at least one of a metal oxide varistor (MOV) or a fuse.

10. The surge protection module set forth in claim 9, wherein the internal protection component is included in a circuit board comprising the at least one electronic circuit.

11. The surge protection module set forth in claim 10, wherein the lighting device comprises a luminaire having a cover, the cover configured to shield the interconnection base and to allow insertion of the surge protection module into the interconnection base.

12. A method, comprising:
providing a lighting device comprising an electronic circuit having an input for receiving power and having an output, the output connected to a light-generating component of the lighting device;
defining a current path between a power source and the input of the electronic circuit by placing a surge protection component in connection with the power source and the input of the electronic circuit; and
after the current path has been broken due to triggering of the surge protection module, restoring the current path by replacing the surge protection component,
wherein the surge protection component is configured to prevent energy of a surge from causing permanent damage to the electronic circuit,
wherein the surge protection component is comprised in a module, the light source comprising an interconnection base adapted to receive the module.
wherein the surge protection component comprises:
a first line input;
a second line input;
a first line output;
a second line output;
a ground connection;
a metal oxide varistor (MOV) stage comprising:
a first fuse connected between the first line input and a first node,
a first MOV connected between the first node and the ground connection,
a second fuse connected between the second line input and a second node,
a second MOV connected between the second node and the ground connection, and
a third MOV connected between the first and second nodes; and
a filter stage, comprising:
a first inductor connected between the first node and the first line output, and
a second inductor connected between the second node and the second line output.

13. The method set forth in claim 12, wherein the electronic circuit comprises an LED driver or an electronic ballast.

14. The method set forth in claim 12, wherein the surge protection device comprises an energy dissipation/diversion stage and a filter stage, the filter stage configured to prevent transients from reaching an internal protection component included in the at least one electronic circuit.

15. The method set forth in claim 12, wherein the first and second inductors each comprise an inductor having an inductance of between 250 and 400 Uh.

16. The method set forth in claim 12, wherein the surge protection module is configured to break the flow of current in response to an end-of-life failure of an internal component of the surge protection module.

* * * * *